E. B. MEAD.
WHEEL.
APPLICATION FILED SEPT. 5, 1918.
1,286,893.
Patented Dec. 3, 1918.
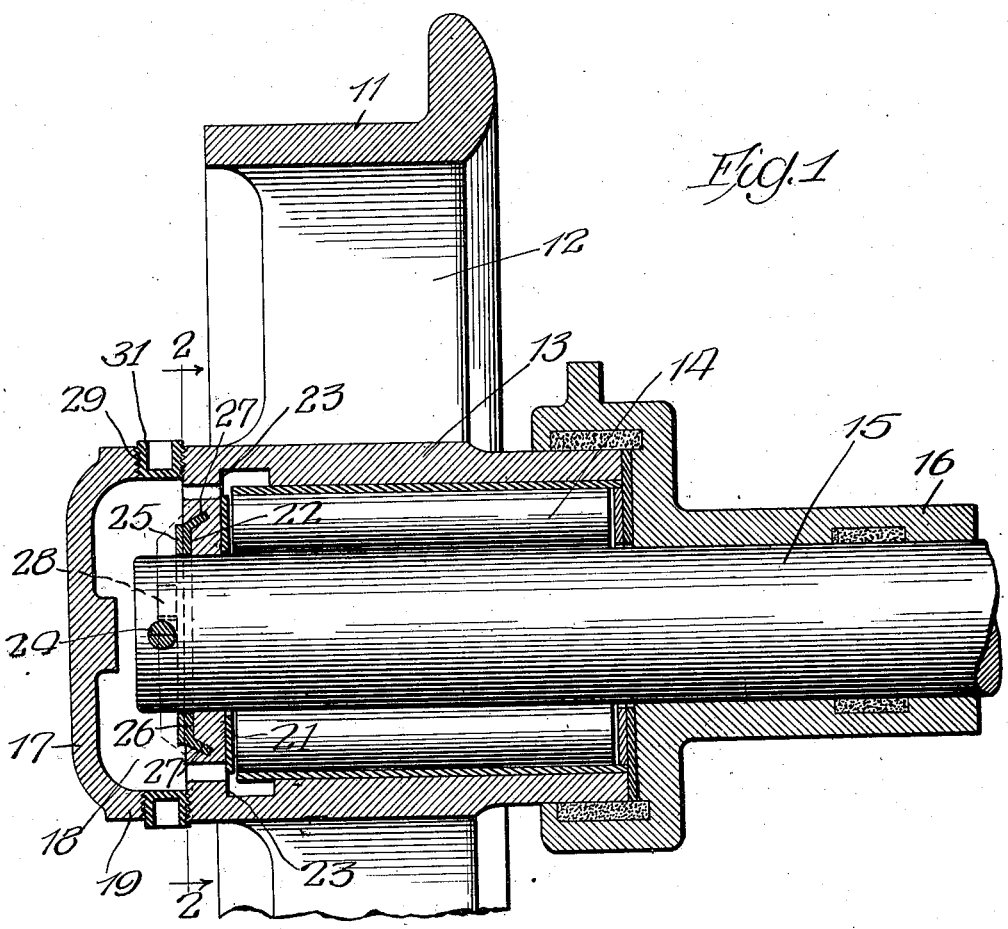
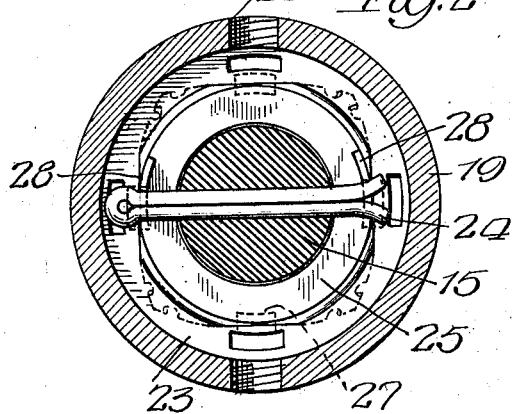
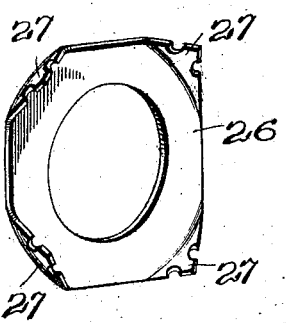

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

WHEEL.

1,286,893.  Specification of Letters Patent.  Patented Dec. 3, 1918.

Application filed September 5, 1918. Serial No. 252,751.

*To all whom it may concern:*

Be it known that I, EZRA B. MEAD, a citizen of the United States, residing in Ottumwa, in the county of Wapello and State of Iowa, have invented a new and useful Improvement in Wheels, of which the following is a specification.

This invention relates in general to wheels and more particularly to wheels for heavy use, as for example wheels for mine cars, trucks, lumber buggies and the like, although it will be manifest as the invention is better understood that it has other and more general use.

My invention relates more particularly also to the type of wheel used in the above-mentioned and other vehicles and which is constructed of cast metal, the hub being closed at its outer end to provide one wall of a chamber the remainder of which is provided by the outer cylindrical portion of the hub and by a partition located inwardly of the outer closure and perforated to permit the end of the shaft to extend through into the chamber thus formed where it may be and usually is secured by a cotter pin disposed through the shaft, which cotter pin is held out of contact with the partition by a washer. Since the shaft and cotter pin must have relative rotation with respect to the wheel hub or with respect to the washer producing in the first instance moving contact between the washer and the partition and in the second moving contact between the washer and cotter pin, the washer or the cotter pin or both rapidly wear out or soon become damaged since neither the cast metal of the partition wall nor the cotter pin by reason of its shape provides a surface conducive to durability in moving contact with the washer.

My invention has for its principal object the provision of new and greatly improved means for localizing the moving contact of the parts, in a construction of this character, to surfaces substantially or relatively frictionless and non-wearing.

My invention contemplates this result in a construction which is simpler, more easily manufactured and cheaper than those in use prior to my invention.

The invention has for a further purpose the elimination of all delicate parts in such a construction and also the arrangement of the parts in such manner that the thrusts resulting from endwise movement of the shaft or axle may be taken up at any point about the perforation in the partition or may be evenly borne by the entire surface about the perforation.

Numerous other objects and advantages of the invention will be apparent as it is better understood from the following description when considered in connection with the accompanying drawing illustrating a preferred embodiment thereof.

On the drawing,

Figure 1 is a partial sectional view of a wheel in which my present invention is embodied;

Fig. 2 is a view taken substantially on the line 2—2 of Fig. 1; and

Fig. 3 is a perspective view of the plate provided in the present instance to form a bearing surface for the washer.

The wheel shown on the drawing consists primarily of a rim 11, spokes 12, a hub 13, and an internal anti-friction or roller bearing organization 14, which need not be described in detail in this application. A shaft 15, having a floating bearing in a box 16 fixed in any suitable manner to the vehicle body (not shown) extends into the hub. The hub, spokes and rim are in the present instance cast in a single piece. The present invention relates to hub and the construction within it and it will be noted that the outer end of the hub is closed by an integral wall 17 cast with the body of the hub. Inwardly of this wall is a chamber 18 formed by the inclosure 17 and outer part 19 of the barrel part of the hub and by an annular partition 21 also cast with the body of the hub and located inwardly a proper distance from the end wall 17. This partition has a large central perforation 22 through which an end of the shaft 15 extends. The chamber 18 is intended to be used as a lubricating chamber and ducts or apertures 23 are provided to conduct the lubricant into the bearing organization 14. A cotter pin 24 is positioned through a suitable aperture in the end of the shaft or axle and this cotter pin is spaced away from the partition 21 by a washer 25. This washer is provided in the chamber by embedding it in the core before casting and it may of course be of any preferred material and has a smooth surface adjacent the side of the partition. The partition in accordance with my invention is specially constructed to provide a smooth surface adjacent the washer and this is accomplished in the present instance by constructing the partition at least in part of a non-wearing smooth material. A plate, having a perforation for the shaft or axle, is also embedded in the core, parts of it however being exposed and projecting out so that it will interlock with or at least be firmly held in the cast body. It preferably forms a part of the partition. In the present instance this plate consists of the sheet indicated at 26 on which are provided lugs 27, the plate and the lugs being cast right into the partition. It is of course immaterial how much of the partition is constituted of the plate, the function being to provide a smooth, non-wearing surface for contact with the washer.

While this might be sufficient by reason of the relatively frictionless character of the adjacent surfaces of the washer and partition to localize the moving contact of the parts in action, I provide also two lugs 28 on the edge of the washer for engaging the opposite ends of the cotter pin to restrain relative rotation between the cotter pin and washer. From certain aspects of the invention, however, it will be manifest that either or both of these lugs may be omitted.

In order to be able to position the cotter pin and manipulate the washer on to the axle, diametrically arranged openings 29 are provided through the hub portion 19 and adapted to be closed by screw plugs 31.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a wheel hub, the combination of a cast metal body providing an integral chamber at the outer end and into which an end of an axle may extend, said chamber being defined at its inner end by a partition within the body, said partition providing a wearing surface within said chamber of material other than cast metal, said material being permanently united in the casting process with said partition, and a washer for embracing the end of the axle and contacting with said wearing surface.

2. In a wheel hub, the combination of a hub portion having an integral chamber at its outer end and formed by a partition within the hub portion, said partition having a perforation to permit an axle to extend into said chamber, a washer within the chamber and engaging the partition about the perforation, the partition, engageable by the washer, having a permanently fixed surface forming a part of the partition which is smoother than the surfaces of the remainder of the inside of the chamber.

3. In a wheel hub, the combination of a portion cast to form an integral chamber into which the end of an axle may extend, a washer in said chamber for embracing the axle, and a plate secured in the cast portion and against movement to form a wearing surface for said washer.

4. In a wheel hub, the combination of a portion of the hub forming an integral chamber into which an end of an axle may extend, a washer cast in said chamber for embracing the axle, and a plate having portions thereof embedded in and permanently secured to the casting to form a wearing surface for said washer.

5. In a wheel hub, the combination of a portion of the hub forming an integral chamber into which an end of an axle may extend, a washer in said chamber for embracing said axle, a cotter pin adapted to extend through the axle and hold said washer in place, and a plate having portions thereof embedded in and cast in the hub to provide a wearing surface for said washer, and means for preventing substantial rotative movement of the washer with respect to the cotter pin.

6. In a wheel hub, the combination of a portion of the hub forming an integral chamber into which an end of an axle may extend, a washer having one or more lugs for engaging a cotter pin in said chamber, a cotter pin adapted to be disposed through the axle and hold the washer thereupon, and a plate having portions thereof embedded in and permanently secured to the casting to form a wearing surface for said washer.

EZRA B. MEAD.

Copies of this patent may be obtained for five cents each, by addressing the "Commissioner of Patents, Washington, D. C."